(12) United States Patent
Gordon et al.

(10) Patent No.: US 7,153,423 B2
(45) Date of Patent: Dec. 26, 2006

(54) WASTEWATER TREATMENT

(75) Inventors: Andrew W. Gordon, Boca Raton, FL (US); Charles R. Cushing, Spring Lake, NJ (US)

(73) Assignee: Water Standard Company, LLC, Boca Raton, FL (US)

( * ) Notice: Subject to any disclaimer, the term of this patent is extended or adjusted under 35 U.S.C. 154(b) by 134 days.

(21) Appl. No.: 11/114,721

(22) Filed: Apr. 25, 2005

(65) Prior Publication Data

US 2005/0236327 A1 Oct. 27, 2005

Related U.S. Application Data

(60) Provisional application No. 60/564,921, filed on Apr. 23, 2004.

(51) Int. Cl.
*E02B 15/04* (2006.01)

(52) U.S. Cl. ............... 210/242.1; 210/242.2; 210/242.4; 210/170

(58) Field of Classification Search ............ 210/242.1, 210/242.2, 242.4, 170
See application file for complete search history.

(56) References Cited

U.S. PATENT DOCUMENTS

| 3,171,808 | A | 3/1965 | Todd |
|---|---|---|---|
| 4,335,576 | A | 6/1982 | Hopfe et al. |
| 4,452,696 | A | 6/1984 | Lopez et al. |
| 5,228,998 | A * | 7/1993 | DiClemente et al. ....... 210/610 |
| 5,478,473 | A * | 12/1995 | Oshima ...................... 210/617 |
| 6,348,148 | B1 | 2/2002 | Bosley |
| 6,363,873 | B1 | 4/2002 | Thomas |
| 6,613,232 | B1 * | 9/2003 | Chesner et al. ............. 210/650 |
| 2002/0060192 | A1 | 5/2002 | Max |
| 2002/0125190 | A1 | 9/2002 | Bosley |

FOREIGN PATENT DOCUMENTS

| EP | 0 959 048 A | 11/1999 |
|---|---|---|
| EP | 1 199 098 A | 4/2002 |

* cited by examiner

*Primary Examiner*—Chester T. Barry
(74) *Attorney, Agent, or Firm*—Ruden McClosky; Stanley A. Kim

(57) ABSTRACT

Offshore facilities, systems, and methods for treating wastewater have been developed. An offshore wastewater treatment facility include wastewater treatment components (for preliminary treatment, primary treatment, secondary treatment, and/or advanced treatment); a means for moving wastewater from a land-based site to the facility; a means for removing treated wastewater from the facility; and a means for removing sludge from the facility. A method of treating wastewater includes: transporting wastewater from a site on land to a wastewater treatment facility located offshore in a body of water, and subjecting the wastewater to preliminary treatment, primary treatment, secondary treatment, and/or advanced treatment.

23 Claims, 5 Drawing Sheets

WASTEWATER TREATMENT

CROSS REFERENCE TO RELATED APPLICATION

The present application claims the priority of U.S. provisional patent application Ser. No. 60/564,921 filed Apr. 23, 2004.

FIELD OF THE INVENTION

The invention relates to facilities, systems, and methods for treating wastewater.

BACKGROUND

Residential, commercial, agricultural, and industrial water usage generates a tremendous volume of wastewater that, left untreated, can present health hazards and environmental concerns. Accordingly, most municipalities employ wastewater treatment facilities downstream of their sewage collection systems to process raw wastewater into a more innocuous form.

Wastewater entering a treatment facility (influent) is about 99% water and 1% a mixture of large objects, solids, dissolved solids, oils, waxes, and organic matter. The latter portion can be separated from the former using a series of treatment steps often termed preliminary treatment, primary treatment, secondary treatment, and advanced treatment. Preliminary and primary treatment removes of solids. Secondary treatment removes dissolved organic matter using microorganisms. Advanced (tertiary) treatment removes nutrients such as nitrogen and phosphorous. Other treatments include disinfection, filtration, and reverse osmosis.

The end products of conventional wastewater treatment systems are treated wastewater and sludge. The treated wastewater is typically disposed of in a body of water (e.g., a stream, river, or ocean) adjacent to the wastewater treatment plant. Sludge is typically dumped at an offsite location, but is sometimes processed for use as fertilizer.

The creation and disposal of these end products as well as the general operation of a wastewater treatment plant can have undesirable effects. For example, the cumulative discharge of treated wastewater into an adjacent body of water can be deleterious to the environment. In addition, the production of sludge can create strong odor which renders the land surrounding the treatment plant undesirable for habitation or occupation.

SUMMARY

The invention relates to facilities, systems, and methods for treating wastewater. In these systems and methods, at least a portion of wastewater treatment is performed offshore. As one example, influent from a municipal sewage system can be subjected to primary treatment on land. The wastewater subjected to this treatment can then be transported (e.g., by pipeline) to a facility located offshore (e.g., on a vessel moored in a body of water) for one or more of secondary treatment, disinfection, and advanced treatment. The resulting treated wastewater can be either discharged offshore or returned to land for further processing or use. The resulting sludge can be transferred back to land for disposal or further processing. The sludge might also be subjected to further treatment (e.g., digestion and/or dewatering) on the vessel before being returned to land.

Because the facilities, systems, and methods of the invention can be operated offshore, a number of drawbacks associated with conventional land-based wastewater treatment operations can be avoided. For instance, the local environmental impact of discharging treated wastewater can be mitigated because the discharge can be dispersed over a much greater area in many offshore locations—especially where the treated wastewater is first mixed with water from the surrounding environment before discharge. In addition, a vessel-based treatment system can increase the efficiency of the treatment process via increased hydraulic retention time due to rocking of the vessel in a body of water. Importantly, the use of offshore wastewater treatment systems reduces the amount of shore-side land required to treat wastewater, and eliminates nuisances from the area such as foul odor. The operation lifespan of the offshore systems of the invention can be extended though modular upgrading—a process that can be difficult to implement in conventional land-based facilities. In addition, the mobility associated with some vessel-based systems facilitates their use in emergency and military applications.

Accordingly, the invention features a vessel (or other offshore facility) for treating wastewater offshore, wherein the vessel includes a wastewater treatment system capable of treating at least 20 million liters per day of wastewater; a wastewater intake in fluid communication with the wastewater treatment system; and an outlet for removing processed wastewater from the vessel. The wastewater treatment system can include a primary treatment system for reducing the amount of suspended solids or greases from wastewater; a secondary treatment system including bacteria capable of reducing the amount of organic matter contained in wastewater; a disinfecting treatment system including a means for killing a microorganism; a nutrient removal system including a means for removing a nutrient including nitrogen or phosphorous from wastewater. The wastewater treatment system can include a sludge processing system including, e.g., a means for removing water from sludge, a bacteria-mediated means for decomposing organic matter, and/or a disinfecting system including a means for killing a microorganism.

The vessel might also include other components such as a power-generating means, a propulsion system for moving the vessel, and/or a chamber for mixing treated wastewater or sludge with water from a body of water surrounding the vessel.

In another aspect the invention features a wastewater treatment facility situated in a body of water located offshore from a land-based wastewater collection system. The wastewater treatment facility can include: (a) a wastewater treatment component capable of treating at least 20 million liters per day of wastewater; (b) a means for moving wastewater from the land-based wastewater collection system to the wastewater treatment facility (e.g., a pipeline or shuttle vessel); (c) a means for removing treated wastewater from the wastewater treatment facility (e.g., an outlet in fluid communication with the body of water, a pipeline, or shuttle vessel); and (d) a means for removing sludge from the wastewater treatment facility (e.g., a pipeline or shuttle vessel). The waste water treatment facility of the invention might also include at least two separate wastewater treatment components that differ in their manner of treating wastewater. The two separate components can be separated by the body of water (e.g., two or more vessels floating on the body of water and connected such that wastewater can flow from at least one to at least another).

In another aspect, the invention features a method of treating wastewater that includes the steps of: transporting wastewater from a site on land to a wastewater treatment facility located offshore in a body of water, and then subjecting the wastewater to: a primary treatment system for reducing the amount of suspended solids or greases from wastewater; a secondary treatment system including bacteria capable of breaking down organic matter contained in wastewater; a disinfecting treatment system including a means for killing a microorganism; and/or a nutrient removal system including a means for removing a nutrient including nitrogen or phosphorous from wastewater. The resulting treated wastewater and sludge can be removed from the wastewater treatment facility to a site on land to the wastewater treatment facility, or discharged into the body of water. In the latter case, the end product can be diluted prior to discharge to reduce the impact on the environment.

Unless otherwise defined, all technical terms used herein have the same meaning as commonly understood by one of ordinary skill in the art to which this invention belongs.

Although methods and materials similar or equivalent to those described herein can be used in the practice or testing of the present invention, suitable methods and materials are described below. All publications, patent applications, patents, and other references mentioned herein are incorporated by reference in their entirety. In the case of conflict, the present specification, including definitions will control. In addition, the particular embodiments discussed below are illustrative only and not intended to be limiting.

DETAILED DESCRIPTION

The present invention provides offshore facilities, systems, and methods for treating wastewater. In brief overview, the systems and methods of the invention include or utilize an offshore wastewater treatment facility, a means for moving wastewater from a land-based site to the offshore wastewater treatment facility, a means for removing treated wastewater from the offshore wastewater treatment facility; and a means for removing sludge from the offshore wastewater treatment facility.

The invention encompasses an offshore wastewater treatment facility for treating wastewater originating from a site on land. The wastewater that is transported from land to the offshore wastewater treatment facility can come from several sources, including consumer, industrial, government facility, or agricultural sources. An offshore wastewater treatment facility of the invention may be equipped to treat wastewater from any of these sources, and may be designed or altered to treat a particular type of wastewater.

Figure 1:
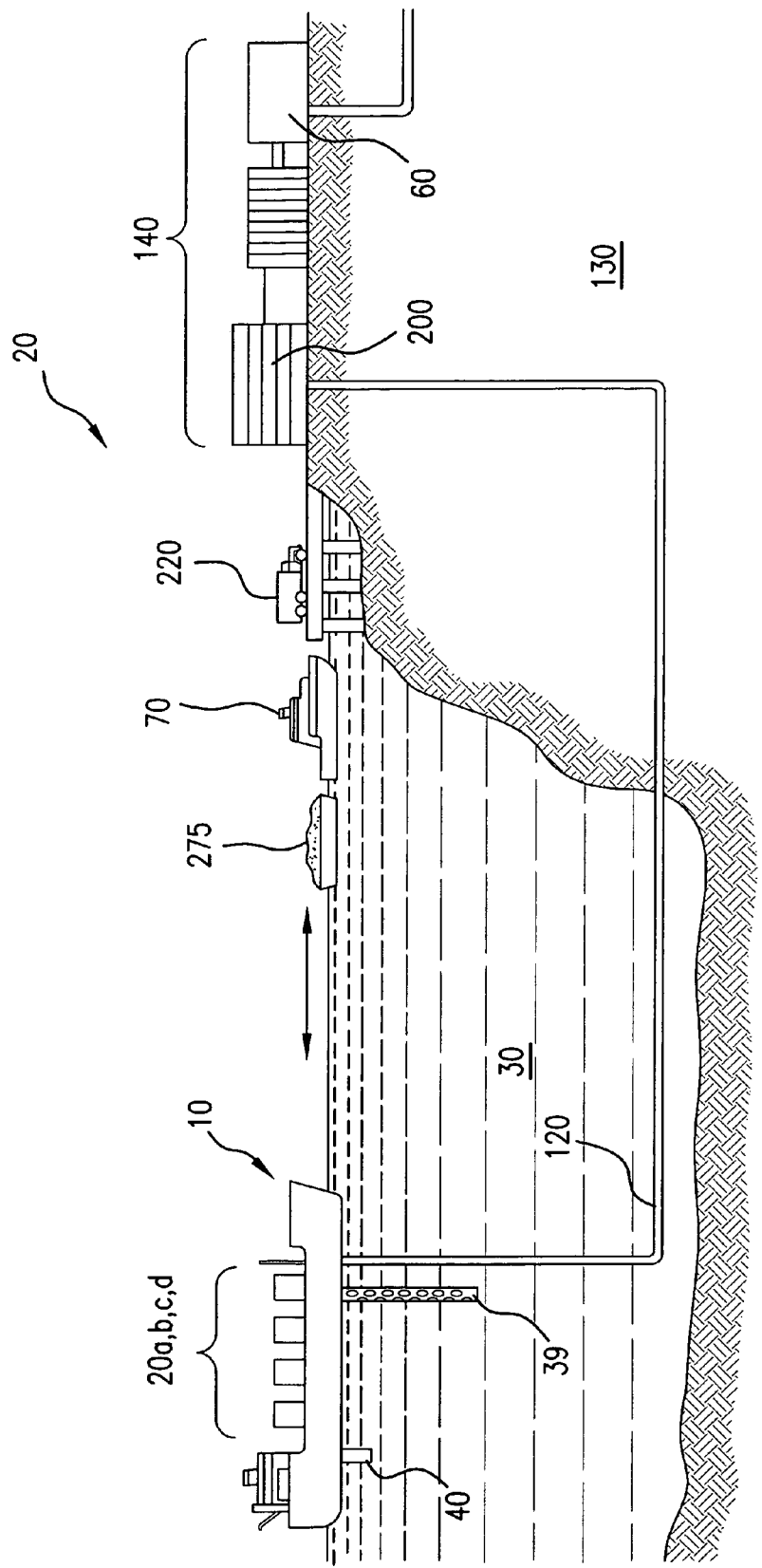
FIG. 1 is a side view of a water treatment system of the invention.

In the embodiments shown in FIGS. 1–4, the offshore wastewater treatment facility is shown as a vessel 10 that includes wastewater treatment components 20a, 20b, 20c, and 20d at least partially disposed within the hull 11 of the vessel 10. In both FIGS. 1 and 2, wastewater from a land-based sewage collection system 60 is delivered to and processed by a land-based preliminary wastewater treatment component 200. The resultant treated wastewater is than transferred to the vessel 10 via a pipeline 120. The wastewater is then further directed to wastewater treatment components 20a, 20b, 20c, and 20d aboard vessel 10 for further processing. In the embodiments shown in FIGS. 1–3 the wastewater treatment process yields sludge 275 and treated wastewater as end products. These end products can be returned to land for further processing or disposal, or can be discharged in the body of water 30 surrounding vessel 10. Referring to FIG. 1, the treated wastewater is discharged into the body of water 30 and the sludge 275 is returned to land using a tug boat drawn barge 70. In the embodiment shown in FIGS. 2 and 3, both the sludge 275 and treated wastewater are returned to land 130.

The offshore wastewater treatment facility of the invention can be any apparatus that (a) can be located on the surface of a body of water and (b) is capable of housing at least one wastewater treatment component. A number of such facilities are known in the art, e.g., a vessel such as a ship (as shown in FIGS. 1–4), a barge, a series of interconnected ships and/or barges, or a floating platform secured to the floor of the body of water. Such vessels may be self-propelled, non-self propelled, manned, or unmanned. Generally, the water treatment system of the invention is configured to treat greater than about three million (e.g., greater than 2.5 million, 3 million, 5 million, 10 million, 15 million, 20 million, 25 million, 50 million, 100 million; 200 million, 300 million, 400 million, 500 million, or 600 million or more) liters of wastewater per day.

As one example, the offshore wastewater treatment facility is a single- or double-hull vessel that has, e.g., a dead weight tonnage (dwt) of between about 10,000 to 500,000; 30,000 and 50,000; 65,000 and 80,000; about 120,000; or about 250,000 and 300,000. The preferred dwt will depend on the particular design of a given system (e.g., the volume of wastewater to be treated per period of time), but should be sufficient to maintain the minimum draft required to keep the vessel afloat, and/or match the desired production capacity of the vessel. Vessels of the invention might further include those features described in U.S. provisional patent application No. 60/564,921, e.g., one or more noise and/or vibration reduction devices, water storage tanks (in this case, for holding treated wastewater prior to removal from the vessel), power sources for powering one or more functions of the vessel, propulsion devices for moving the vessel in a body of water, and/or control systems for controlling the operation of the various systems (e.g., a wastewater intake system, a treated wastewater discharge system, a treated wastewater transfer system, and a power source) onboard the vessel.

As shown in FIGS. 1–4, at least a portion of one or more of the wastewater treatment components can be disposed above the main deck of the offshore wastewater treatment facility. For example, one or more of the wastewater treatment components can be compartmentalized in containers and interconnected to one another and coupled to the main deck. In addition, at least a portion of one or more of the wastewater treatment components is disposed below the main deck of the offshore wastewater treatment facility. The one or more of the wastewater treatment components can also be disposed both above and below the main deck of the offshore wastewater treatment facility.

The offshore wastewater treatment facility can further include at least one (e.g., 1, 2, 3, 4, 5, 10 or more) wastewater intake port and at least one (e.g., 1, 2, 3, 4, 5, 10, or more) treated wastewater discharge port or oscillating multi-port dispersion through which treated wastewater is discharged from the offshore wastewater treatment facility.

Figure 2:
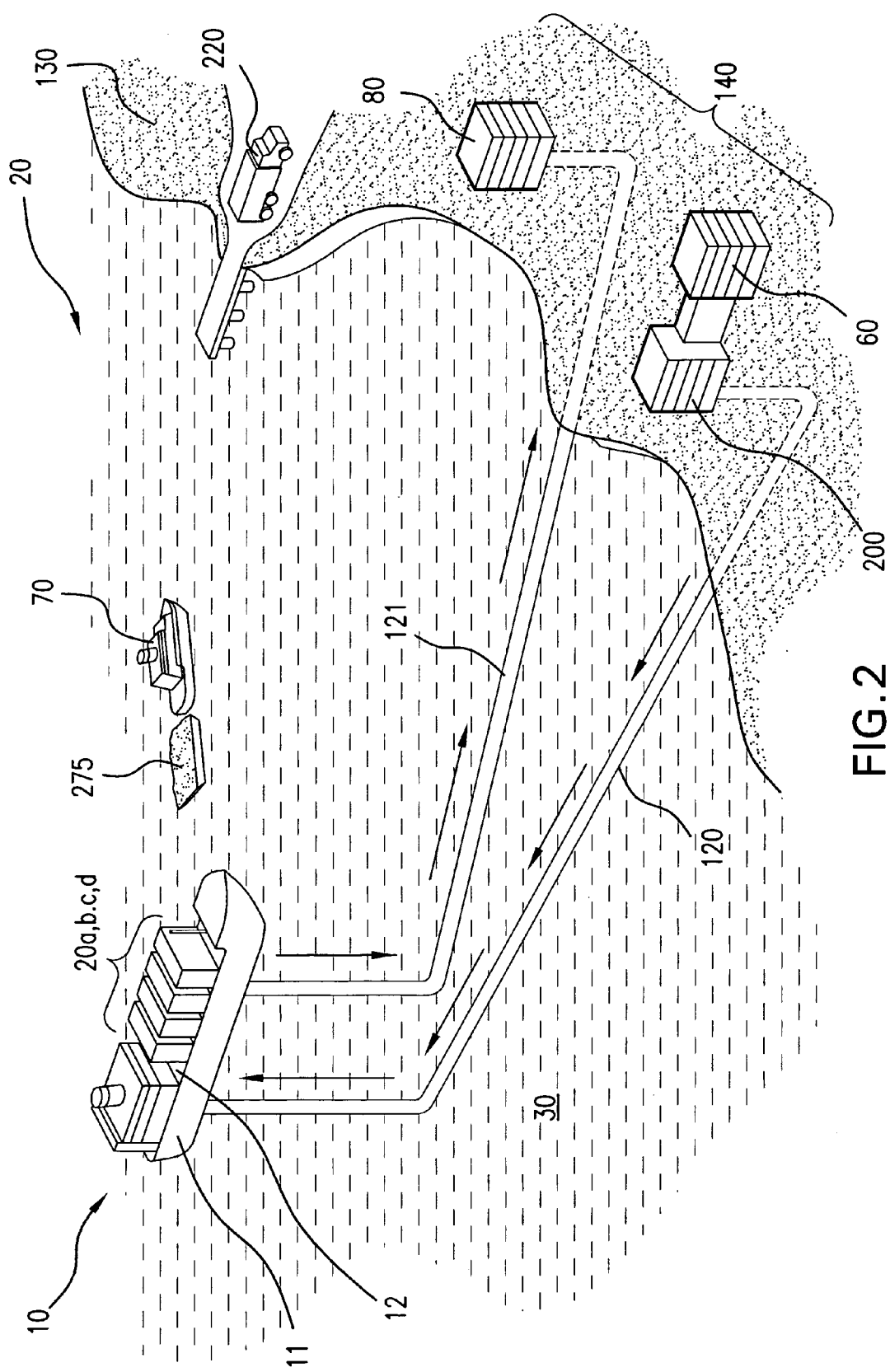
FIG. 2 is a side view of a water treatment system of the invention.
Figure 3:
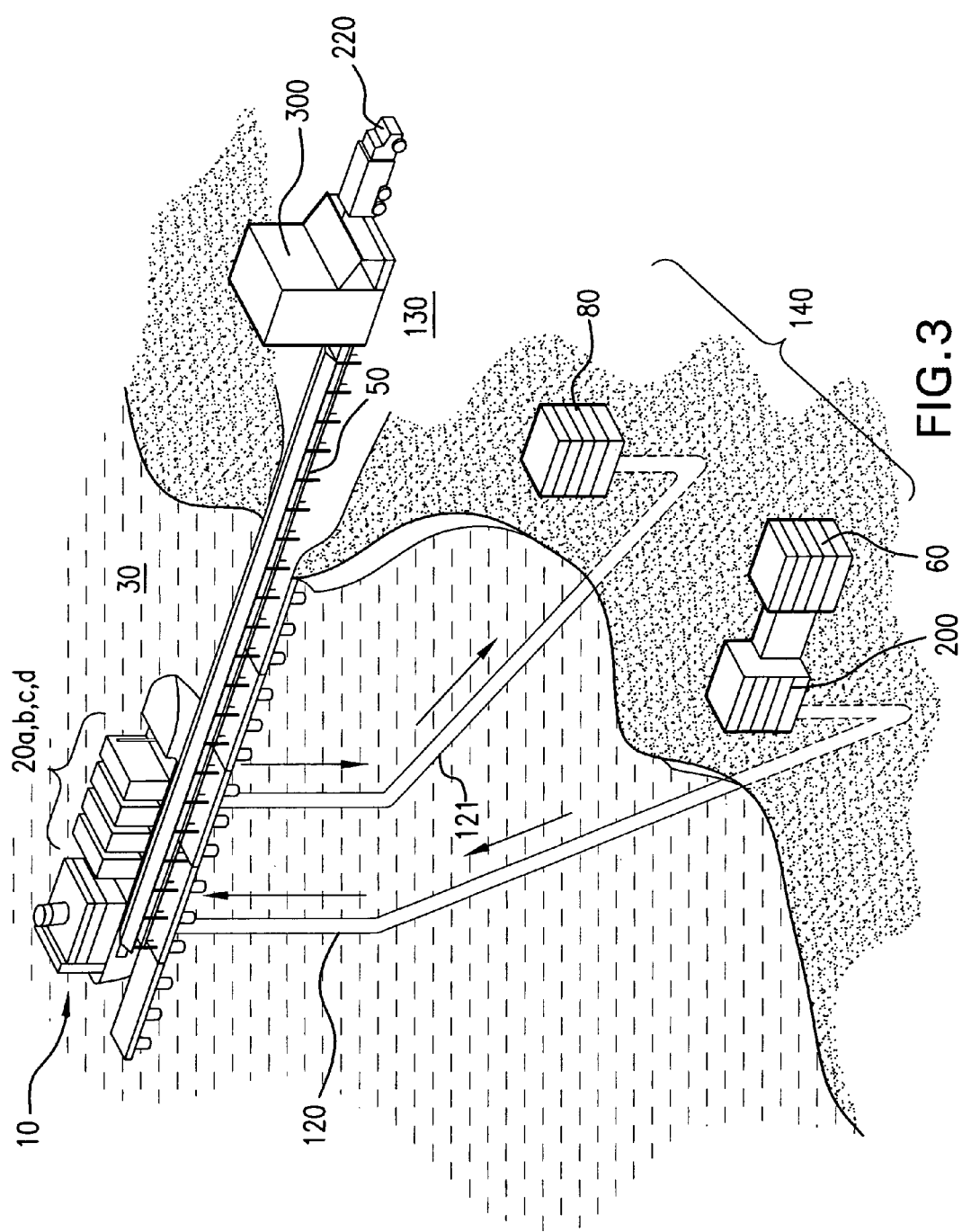
FIG. 3 is a perspective view of a water treatment system of the invention.

The offshore wastewater treatment facility can includes at least one wastewater treatment component such as wastewater treatment components 20a, 20b, 20c, and 20d shown in FIGS. 1–3. Wastewater treatment components suitable for use in the invention are any capable of performing at least one step in a wastewater treatment protocol, e.g., removing one or more non-water substances such as solids, oils, waxes, organic matter, and dissolved solids from the wastewater. Components used in land-based wastewater treatment are well known in the art. See, e.g., *Wastewater Treatment Plants: Planning, Design, and Operation, Second Edition,* Syed R. Qasim, Ed., CRC Press, 1998; and *Design of Municipal Wastewater Treatment Plants* (Asce Manual and Reports on Engineering Practice), 4th edition, American Society of Civil Engineers, 1998. These components can be used in the vessel-based systems and methods of the invention with slight or no modifications.

In some embodiments of the invention, the individual components making up the complete wastewater treatment system are all contained on one or more vessels. Typically, however, some of the individual components making up the complete wastewater treatment system are located aboard one or more offshore wastewater treatment facilities, while others are located at one or more land-based facilities. See, e.g., the embodiments shown in FIGS. 1–3 where a preliminary treatment component 200 is on land 130.

Examples of wastewater treatment components that can be included in the invention include: a preliminary component, a primary treatment component, a secondary treatment component, a final treatment component, an advanced treatment component, and a reverse osmosis treatment component. In a typical arrangement, wastewater is sequentially treated in the order of the foregoing list.

In one embodiment of the invention, the wastewater treatment steps that are performed on a body of water are all performed on a single offshore facility having thereon all wastewater treatment components required to accomplish the aforesaid steps. In other embodiments, the wastewater treatment steps that are performed on a body of water are performed on at least two offshore facilities each having at least one different wastewater treatment component. For example, a first vessel can include the components for performing primary and secondary treatment, and a second vessel can contain the components for performing final treatment and/or advanced treatment. In the latter example, the wastewater treated on the first vessel would be transported to the second vessel for additional treatment.

The preliminary treatment component of a wastewater treatment system of the invention can take the form of any device suitable for removing large objects or impurities such as sticks, rags, large food particles, sand, and gravel from wastewater. An example of a suitable system for pretreatment is a series of grates or screens through which a wastewater stream is flowed. As the wastewater passes through the grates/screens, the large objects/impurities are caught, while the remainder of the wastewater flows through for possible further processing. In a preferred arrangement, a plurality of grates or screens are used to remove objects larger than about 5, 4, 3, 2, 1, 0.5, or 0.2 cm. Wastewater processed through a pretreatment component can further be subjected to primary treatment.

The primary treatment component of a wastewater treatment system can take the form of any device suitable for removing undissolved solids or liquids from wastewater. An example of a suitable device is a sedimentation tank system.

In this system, flowing wastewater is directed into a holding tank for a period of time sufficient to allow particles to settle to the bottom and greases and other materials with a density less than that of water to float to the top. The solids are then drawn off the bottom of the tank and the greases and other floating materials are skimmed off the top. Flocculants might also be used in this process to improve the settling process. The treated wastewater remaining in the tank is then removed. Wastewater processed through a primary component can further be subjected to secondary treatment.

The secondary treatment component of a wastewater treatment system of the invention can take the form of any device suitable for microorganism-mediated removal of organic matter from wastewater. Such devices provide bacteria and other microorganisms that metabolize the organic matter and a suitable environment for facilitating this process, e.g., one or more containers with a mixer and aerator (e.g., Sequencing Batch Reactors, Aqua-Aerobic Systems, Inc., Rockford, Ill.). The addition of the microorganisms to the wastewater can include fixed film systems, suspended film systems, and/or lagoon systems. An example of a secondary treatment component is the AquaMB system marketed by Aqua-Aerobic Systems Inc. (Rockford, Ill.). This system includes a microfiltration unit produced by PALL Corp. (Cortland, N.Y.).

In secondary treatment systems, the microorganisms grow in size and number as they absorb organic matter and nutrients from the wastewater. After several hours (e.g., 1.5, 2.0, 2.5, 3.0, 3.5 hours) of suspension, the microorganisms settle out as sludge. Some of this sludge is removed for disposal or processing, and some is retained in the system as "seed" microorganisms for processing additional wastewater.

Once wastewater has undergone treatment in the secondary treatment tank, it can be directed to a number of different places. In some embodiments of the invention, wastewater subjected to secondary treatment is removed from the system (e.g., returned to the environment) or retained in the system for additional treatment such as final treatment or advanced treatment.

The final treatment component of a wastewater treatment system of the invention can take the form of any device or agent suitable for disinfecting wastewater. For example, wastewater subjected to secondary treatment may be disinfected using chlorine or ultraviolet irradiation. When chlorine is used to disinfect the water, final treatment can also include the addition of a chlorine-neutralizing chemical to the treated wastewater as high levels of chlorine in the treated wastewater can precipitate negative environmental effects in the bodies of water into which the treated wastewater is discharged.

The advanced (or tertiary) treatment component of a wastewater treatment system can take the form of any device or agent suitable for removing nutrients from treated wastewater. Advanced treatment might involve adding chemicals to the treated wastewater to help settle out or strip out phosphorous or nitrogen. For example, phosphorous might be removed from wastewater using a coagulant, and ammonia might be removed by air stripping.

The wastewater treatment system of the invention might include filtration components and a reverse osmosis component. For example, wastewater subjected to secondary and/or advanced treatment might be treated with one or more filtration steps to remove undissolved solids and microorganisms. In an exemplary embodiment, wastewater subjected to at least secondary treatment is sequentially filtered through a 10 micron pore size filter and then through a 0.1 micron pore size filter. Wastewater treated in this manner might be suitable for agricultural or industrial use.

In the invention, wastewater can be further purified using reverse osmosis to remove dissolved solids. A reverse osmosis system useful in the invention includes a high pressure pump and a reverse osmosis membrane. A high pressure pump operable to push the wastewater through the reverse osmosis membrane includes any pump suitable to generate the hydraulic pressure necessary to push the wastewater through the reverse osmosis membrane. Wastewater treated in this manner might be rendered potable.

The wastewater treatment systems of the invention also include a means for moving wastewater from a land-based site to an offshore facility having thereon at least one wastewater treatment component. Wastewater to be treated generally comes from a land-based sewage collection system. A sewage collection system is a system by which municipal wastewater and sewage is collected. A sewage collection system includes one or more structures (e.g., buildings) outfitted for wastewater and sewage collection. A number of means for moving a fluid from a site on land (e.g., sewage collection system) to an offshore facility are known. Any means suitable for use in the invention might be used. For example, wastewater might be transported from a site on land to an offshore facility using a shuttle ship (e.g., transfer vessel) or barge outfitted with one or more storage tanks and equipment for accepting and ejecting wastewater from the one or more tanks. To improve efficiency, as shown in FIGS. 1–3, a preferred means for moving a fluid from a site 140 on land to the vessel 10 on a body of water is a pipeline 120. For example, in FIG. 1, a pipeline 120 is used as a conduit through which wastewater moves from a sewage collection system 60 and/or preliminary wastewater treatment component 200 to a wastewater intake system on the vessel 10. The wastewater intake system can receive wastewater from floating, submerged (e.g., seabed), or sea-floor stabilized pipelines.

A first end of the sea-floor stabilized pipeline can be disposed above the surface of the water. The first end of the sea-floor stabilized pipeline is in communication with the offshore facility of the invention. A second end of the sea-floor stabilized pipeline can be disposed proximate to the land-based site (e.g., water treatment facility, sewage collection system). In one embodiment, a portion of the sea-floor stabilized pipeline proximate to the first end passes through the permanent buoy. In another embodiment, a portion of the sea-floor stabilized pipeline proximate to the first end is integral with the permanent buoy.

The systems and methods of the invention typically include a wastewater intake pump to direct the incoming wastewater to the appropriate treatment system (e.g., primary treatment system, secondary treatment system, tertiary treatment system). If the incoming wastewater is to be subjected to secondary treatment, for example, the wastewater intake pump sends the wastewater to the secondary treatment component (e.g., one or more Sequencing Batch Reactors, Aqua-Aerobic System, Inc., Rockford, Ill.). As another example, if the incoming wastewater is to be subjected to reverse osmosis, the wastewater intake pump sends the wastewater to the high pressure pump of the reverse osmosis system. The high pressure pump pushes the wastewater through the reverse osmosis membrane to treat or purify the wastewater while the microorganisms and other impurities remain on the opposing side of the membrane.

The land-based site is typically a wastewater treatment facility which can include a partial wastewater treatment facility wherein only preliminary and primary wastewater treatment occurs. Alternatively, the wastewater treatment facility can include a complete wastewater treatment facility that has become disabled with regard to secondary and final wastewater treatment steps. The received wastewater includes wastewater that has not previously undergone any treatment. The received wastewater also includes wastewater that has previously undergone preliminary and primary treatment at a land-based site (e.g., wastewater treatment facility). In this embodiment, the wastewater entering the wastewater intake can contain microorganisms corresponding to the secondary treatment of wastewater.

Once the wastewater received by the offshore facility has been subjected to the appropriate treatment(s), it is typically removed from the offshore facility. This treated wastewater can be discharged into the water surrounding the offshore facility, it can be transferred to a water-borne vessel, or it can be transferred to a land-based site. Treated wastewater transferred to a land-based site can be subjected to further treatment(s) or it can be distributed for use in irrigation or industrial applications. If subjected to the appropriate treatments (e.g., reverse osmosis), treated wastewater can be transferred to a land-based site and used for human or animal consumption. Land-based distribution sites and systems are described in detail in U.S. provisional patent application Ser. No. 60/564,921.

Referring again to FIG.1, a system of the invention includes a means for removing treated wastewater from a vessel 10 via an outlet in fluid communication with the water 30 surrounding the vessel 10 (FIG. 1). The outlet can include one or more discharge ports 40 disposed in the hull 11 of the vessel 10 through which treated wastewater is discharged into the water 30 surrounding the vessel 10. The discharge port(s) 40 may be disposed in the hull 11 of the vessel 10 such that the discharge port(s) 40 is physically located below or above the water line of the vessel 10. The means may further include a pump to increase the water pressure of the treated wastewater prior to being discharged through the discharge port(s) 40.

In the invention, the offshore wastewater treatment facility might include a mixing system in communication with the wastewater treatment component(s) and the means for removing treated wastewater from the vessel. The mixing system mixes treated wastewater with water taken directly from the surrounding body of water before discharging the treated wastewater. Such a system is operable to dilute and/or cool the treated wastewater before returning it to the surrounding body of water. A mixing system can include a mixing tank having an inlet, an outlet, a mixing water intake system including a water intake and a pump, a series of baffles, and a mixing barrier having a plurality of apertures, wherein water taken in through the mixing water intake system (i.e., water from the body of water surrounding the offshore facility) and the treated wastewater are forced through the mixing barrier and mixed before flowing to the means for removing wastewater from the offshore facility. The size, shape, location and number of apertures are selected to optimize mixing of the treated wastewater with the water from the body of water surrounding the offshore facility. The apertures induce turbulence in fluids flowing through the mixing barrier. The mixing barrier extends from one side of the mixture tank to the opposing side of the mixing tank. Adjacent baffles are coupled to opposing sides of the mixing tank. The baffles are arranged in a staggered relationship such that a portion of each baffle overlaps with an adjacent baffle. The fluid passing though the mixing barrier must follow a convoluted route before reaching the treated wastewater discharge system.

In another embodiment, the mixing system includes a mixing tank having a treated wastewater inlet, a treated wastewater outlet, a mixing water intake system including a water intake and a pump, and any device capable of forming a substantially homogeneous mixture from the treated wastewater and the water taken from the water surrounding the offshore facility. Examples of such devices include high speed paddle mixers and a static mixer.

In some embodiments, treated wastewater is transferred to a water-borne vessel or to a land-based facility rather than being discharged into the water surrounding the offshore wastewater treatment facility. The invention therefore provides a means for removing treated wastewater from the offshore facility to another vessel (e.g., a transfer vessel such as a tug-barge, tanker vessel) or to a land-based facility. The system 20 shown in FIG. 2 generally includes a vessel 10 having one or more wastewater treatment components 20*a*, 20*b*, 20*c*, 20*d* and a means for removing treated wastewater from the vessel 10 to a land-based facility 140 (e.g., wastewater treatment or distribution facility 80). If the offshore facility is located off-shore as shown in FIG. 2, the system 20 of the invention preferably includes a single pipeline 120 (e.g., floating, seabed pipeline) but can also include a plurality of pipelines for removing the treated wastewater from the vessel 10 and transporting it to another vessel or to a land-based facility. In some embodiments, the means can include a transfer vessel (e.g., a tugboat drawn bargeunit or a converted single or double hull tanker). In the system shown in FIG. 3, treated wastewater is removed by a conveyor belt 50 that is in communication with the vessel 10 and the land-based facility 140. The conveyor belt 50 can be configured to deliver the treated wastewater to a vehicle 220 (e.g., truck) that then delivers the treated wastewater to the land-based site 140 or the conveyor belt 50 can deliver the treated wastewater directly from the vessel 10 to the land-based site 140. Any suitable means, however, may be used to transfer treated wastewater to a land-based site 140. The terms "land-based," "on land," "shore-based," and "on shore" refer to systems and structures that are primarily or entirely disposed on land 130 or shore 130.

In embodiments in which treated wastewater is transferred from an offshore wastewater treatment facility to a water-borne vessel (e.g., a transfer vessel or shuttle ship), a transfer line that communicates the treated wastewater between the offshore wastewater treatment facility and the transfer vessel is typically used. The transfer line communicates a treated wastewater storage compartment at the offshore wastewater treatment facility with a treated wastewater storage compartment internal to the transfer vessel. Support vessels can be used as needed to facilitate the transfer of treated wastewater between the offshore wastewater treatment facility and the transfer vessel. Generally, the transfer of treated wastewater between the offshore wastewater treatment facility and the transfer vessel can be performed while both are in motion with respect to shore or while both are moored or anchored. The offshore wastewater treatment facility can continue producing treated wastewater during the transfer process.

The sludge resulting from wastewater treatment can be processed and stored at the offshore wastewater treatment facility. In the system shown in FIG. 4A, the sludge treatment components 280 remove and process the sludge collected during the wastewater treatment process. In one embodiment, the sludge is transferred to a digestion tank (which can be located on the offshore wastewater treatment facility, at another offshore facility, or on land) wherein aerobic and anaerobic digestion techniques are used to decompose organic components in the sludge. The digestion stabilizes the sludge and reduces odors. To kill disease-causing organisms, the sludge may also be treated with caustic chemicals or ultraviolet light. After treatment, the sludge can be reintroduced into the environment, e.g., by discharge into the body of water surrounding the offshore wastewater treatment facility or by disposal at land-based dump. Sludge can also be used a as fertilizer. To facilitate handling, the mass of sludge can be reduced by dewatering, e.g., using a belt filter press to remove water from sludge and produce a non-liquid cake.

To discharge or transfer treated sludge, the invention provides a means for removing treated sludge from an offshore wastewater treatment facility. In embodiments shown in FIGS. 2 and 3, for example, a tugboat drawn barge 70 is used to transfer treated sludge 275 from a vessel 10 to a sludge disposal/distribution facility 300. As another example, in FIG. 3, a conveyor belt 50 is used to transfer treated sludge 275 from a vessel 10 to a sludge disposal/distribution facility 300.

In some embodiments, treated sludge can be discharged from the offshore wastewater treatment facility into the surrounding body of water. In these embodiments, the means for removing sludge from the offshore wastewater treatment facility includes a treated sludge discharge port. The treated sludge discharge port is any suitable structure that is in communication with the sludge treatment components and the water surrounding the offshore wastewater treatment facility. If the treated sludge is being discharged into the water surrounding the offshore wastewater treatment facility, it is preferably diluted with water from the water surrounding the offshore wastewater treatment facility before being discharged. The sludge can be mixed with water from the water surrounding the offshore wastewater treatment facility by similar means as those described above for mixing treated wastewater with water from the water surrounding the offshore wastewater treatment facility.

Referring again to FIG. 1, in a system 20, wastewater (e.g., sewage) is collected at a sewage collection system 60 (located on land 130), and transferred to a preliminary treatment component 200 where large objects such as sticks, sand, gravel, etc. are removed. The treated wastewater is then transported to a vessel 10 via a pipeline 120. The wastewater enters the intake chamber 320 on vessel 10 where it is directed to wastewater treatment components 20*a*, 20*b*, 20*c*, 20*d* where the wastewater undergoes one or more wastewater treatments, resulting in treated wastewater and sludge 275. Before being discharged from the vessel 10, the treated wastewater is diluted with water 30 from the water surrounding the vessel 10. This is accomplished via a mixing system that is in communication with the wastewater treatment means and a means for removing treated wastewater from the vessel 10. The mixing system includes a water intake 39 for taking up water from the water 30 surrounding the vessel. The water intake 39 has a plurality of apertures through which water is taken up from the water 30 surrounding the vessel 10. Once mixed, the treated wastewater is discharged through an outlet in fluid communication with the water surrounding the vessel. The outlet has a discharge port 40 disposed in the hull 11 of the vessel 10 through which the treated wastewater is discharged from the vessel 10 into the water 30 surrounding the vessel 10. The sludge 275 that results from the wastewater treatment process is removed from the vessel 10 via a tugboat drawn barge 70 that transports the sludge to a land-based site 140. A vehicle 220 is used to transfer the sludge 275 from the tugboat drawn barge 70 to a land-based site.

The embodiment of FIG. 2 is similar to that of FIG. 1, except that in the former, treated wastewater is moved to a land-based site 140 (water treatment and/or distribution facility 80) via pipe 121 rather then being discharged into the water 30 surrounding the vessel 10. The embodiment of FIG. 3 is similar to that of FIGS. 1 and 2 except that the vessel 10 is located offshore adjacent to a dock rather than further offshore. The wastewater enters the vessel 10 and is discharged from the vessel 10 by the same means as the systems of FIG. 2. The treated wastewater is moved to a water treatment and/or distribution facility 80. The resultant sludge in this embodiment is moved from the vessel 10 a sludge disposal/distribution facility 300 to using a conveyor belt 50. At the sludge disposal/distribution facility 300, the sludge can be disposed of or treated further. From this facility 300, the sludge 275 can be transported to another destination for agricultural or industrial use, for example, via vehicle 220.

Figure 4A:
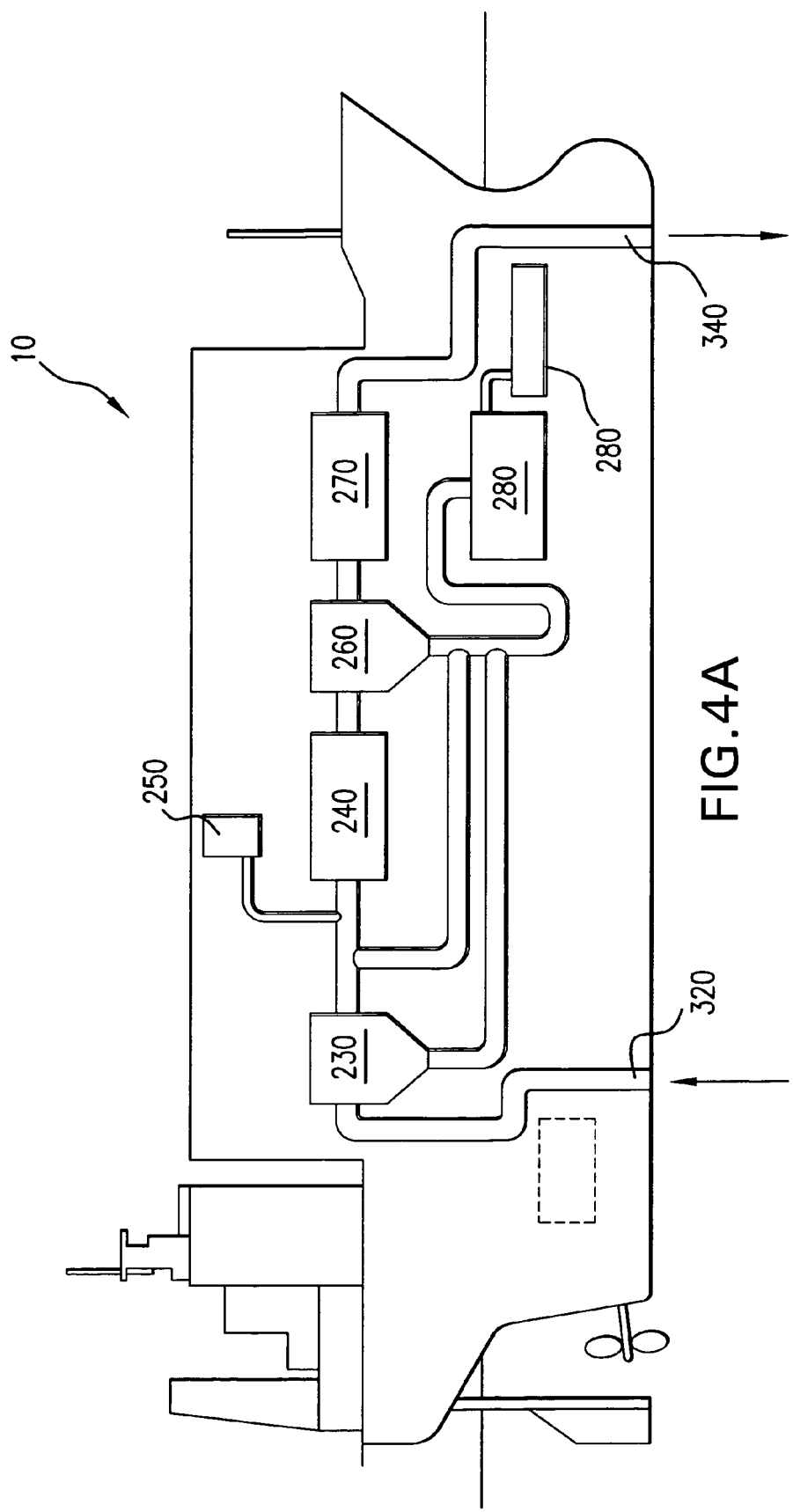
FIG. 4A is a side view of a vessel of the invention.

Referring now to FIG. 4A, a cut-away side view of a vessel 10 having primary, secondary and advanced treatment components is shown. Wastewater is received into the vessel 10 via an intake chamber 320 that is in fluid communication with a first pipeline 120. The wastewater then proceeds to the primary treatment settling or sedimentation tank 230 where undissolved solids are removed. The wastewater then proceeds to the secondary treatment bioreactor 240 where microorganisms absorb organic matter and nutrients from the wastewater. After several hours of suspension, the microorganisms settle out as sludge 275. Some of this sludge 275 is removed and directed to the sludge treatment components 280 for processing and discharge from the vessel 10 while some of the sludge 275 is retained in the secondary treatment bioreactor 240 for treating additional wastewater. The wastewater then proceeds to the secondary treatment tank 260 for further secondary treatment. From there, the wastewater proceeds to the final treatment tank 270 where it is disinfected. The treated wastewater can be discharged from the vessel at this time via passage through the discharge chamber 340 and a pipeline that moves the treated wastewater from the vessel 10 to a land-based facility 140 where it can be disposed of or distributed. The treated wastewater can also be discharged from the vessel 10 into the water 30 surrounding the vessel 10 via the discharge port 40 shown in FIG. 1. Alternatively, the treated wastewater can proceed from the final treatment tank to tertiary treatment where it is subjected to chemicals that are contained within the chemical feed 250. Once the wastewater has been subjected to advanced treatment, it is then either discharged from the vessel 10 into the water 30 surrounding the vessel 10 or it is discharged through the discharge chamber 340 and into a pipeline 120 that moves it to a land-based facility 140 where it can be disposed of or distributed.

Figure 4B:
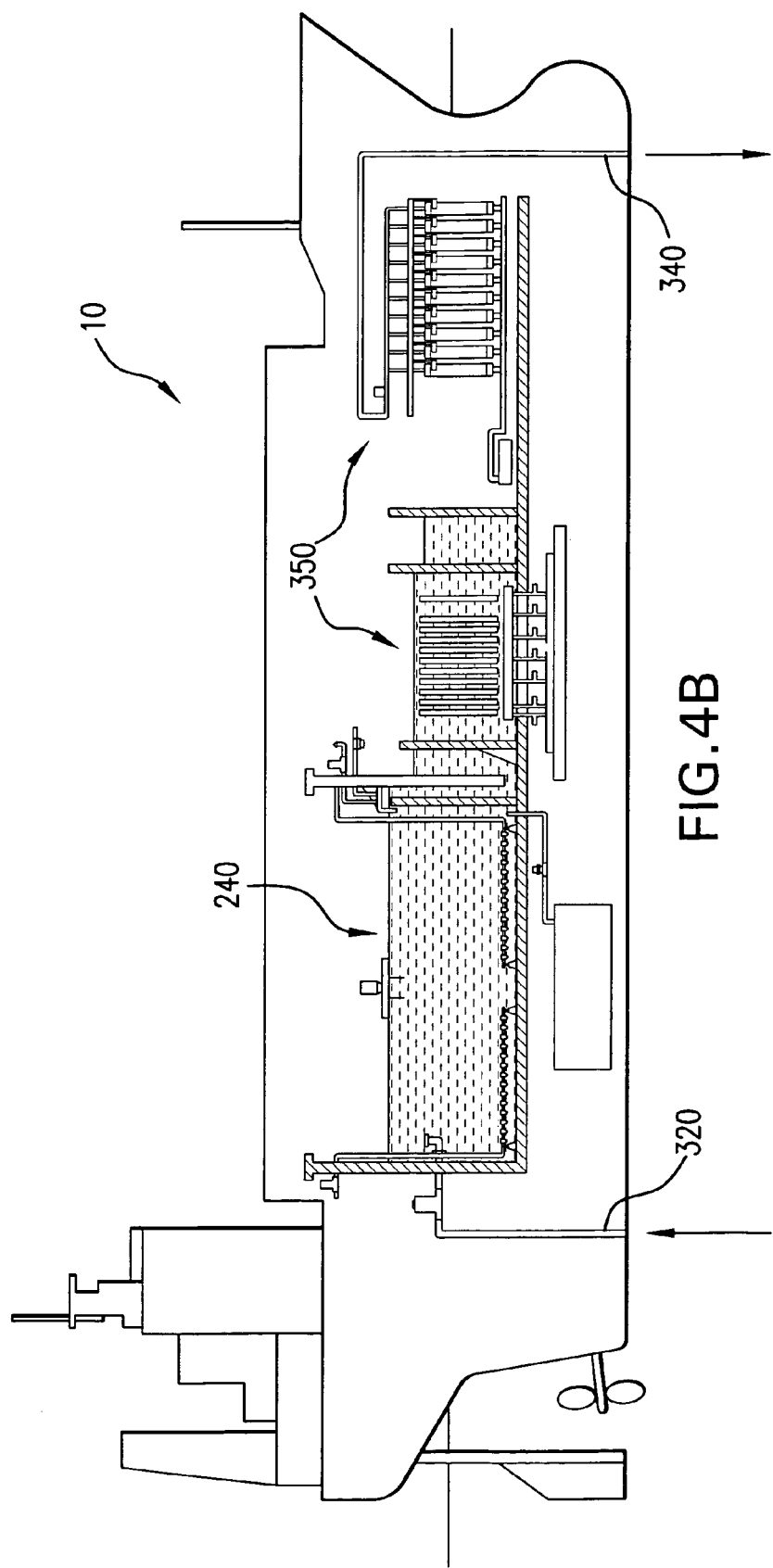
FIG. 4B is a side view of another vessel of the invention.

Referring to FIG. 4B, a cut-away side view of a vessel 10 having secondary treatment components is shown. The wastewater has already been subjected to preliminary and primary treatments to remove large solids, suspended solids and greases either on land or on another water-borne vessel. Wastewater is received into the vessel 10 via an intake chamber 320 that is in fluid communication with a first pipeline 120. The wastewater then proceeds to the bioreactor 240 where separate mixing and aeration devices allow the contents of the reactor (i.e., microorganisms and wastewater) to undergo biomass conditioning and nutrient reduction (i.e., organic matter and nutrients are removed from the wastewater) by alternating aerobic and anoxic periods. Following quiescent settling, wastewater from the reactor is transferred to a first microfiltration unit 350 having a 10 micron cloth media filter. Wastewater is filtered as it passes through the 10 micron cloth media. Filtered wastewater is collected in a center tube where it is directed to a supply channel that feeds a second microfiltration unit 350. Water enters the second microfiltration 350 unit where low positive pressure enables the wastewater to pass through a plurality of 0.1 micron membranes, excluding fine particulates down to 0.1 microns in size. Water filtered through the membranes is taken directly from the top of the second microfiltration unit 350 and is discharged from the vessel 10 via the discharge chamber 340. This treated wastewater can be discharged into the water 30 surrounding the vessel 10 or it can be moved to a land-based 140 site for further treatment (e.g., reverse osmosis), distribution, or disposal.

While the above specification contains many specifics, these should not be construed as limitations on the scope of the invention, but rather as examples of preferred embodiments thereof. Accordingly, the scope of the invention should be determined not by the embodiments illustrated, but by the appended claims and their legal equivalents.

What is claimed is:

1. A vessel for treating wastewater offshore, the vessel being positioned on the surface of a body of water and comprising:
   a hull;
   a wastewater treatment system disposed at least partially within the hull, the wastewater treatment system being capable of treating at least 20 million liters per day of wastewater to yield end products comprising sludge and treated wastewater;
   a wastewater intake in fluid communication with the wastewater treatment system;
   an outlet for removing treated wastewater from the vessel; and
   a mixing system for mixing at least one of the end products with water from the body of water, the mixing system comprising a mixing tank located on the vessel and comprising an inlet and an outlet.

2. The vessel of claim 1, wherein the wastewater treatment system comprises a primary treatment system for reducing the amount of suspended solids or greases in wastewater.

3. The vessel of claim 1, wherein the wastewater treatment system comprises a secondary treatment system comprising bacteria capable of reducing the amount of organic matter contained in wastewater.

4. The vessel of claim 1, wherein the wastewater treatment system comprises a disinfecting treatment system comprising a means for killing a microorganism.

5. The vessel of claim 1, wherein the wastewater treatment system comprises a nutrient removal system comprising a means for removing a nutrient comprising nitrogen or phosphorous from wastewater.

6. The vessel of claim 1, wherein the wastewater treatment system comprises at least two of the following systems: a primary treatment system for reducing the amount of suspended solids or greases in wastewater; a secondary treatment system comprising bacteria capable of reducing the amount of organic matter contained in wastewater; a disinfecting treatment system comprising a means for killing a microorganism; and a nutrient removal system comprising a means for removing a nutrient comprising nitrogen or phosphorous from wastewater.

7. The vessel of claim 1, wherein the wastewater treatment system comprises at least three of the following systems: a primary treatment system for reducing the amount of suspended solids or greases in wastewater; a secondary treatment system comprising bacteria capable of reducing the amount of organic manor contained in wastewater; a disinfecting treatment system comprising a means for killing a microorganism; and a nutrient removal system comprising a means for removing a nutrient comprising nitrogen or phosphorous from wastewater.

8. The vessel of claim 1, wherein the wastewater treatment system comprises: a primary treatment system for reducing the amount of suspended solids or greases from wastewater; a secondary treatment system comprising bacteria capable of reducing the amount of organic matter contained in wastewater; a disinfecting treatment system comprising a means for killing a microorganism; and a nutrient removal system comprising a means for removing a nutrient comprising nitrogen or phosphorous from wastewater.

9. The vessel of claim 1, further comprising a sludge processing system.

10. The vessel of claim 9, wherein the sludge processing system comprises a means for removing water from sludge.

11. The vessel of claim 9, wherein the sludge processing system comprises a bacteria-mediated means for decomposing organic matter.

12. The vessel of claim 9, wherein the sludge processing system comprises a disinfecting system comprising a means for killing a microorganism.

13. The vessel of claim 1, further comprising a power-generating means.

14. The vessel of claim 1, further comprising a propulsion system far moving the vessel.

15. A wastewater treatment facility situated in a body of water located offshore from a land-based wastewater collection system, the wastewater treatment facility comprising:
(a) a wastewater treatment component being capable of treating at least 20 million liters per day of wastewater, the component being selected from the group consisting of: a primary treatment system for reducing the amount of suspended solids or greases in wastewater; a secondary treatment system comprising bacteria capable of reducing the amount of organic matter contained in wastewater; a disinfecting treatment system comprising a means for killing a microorganism; and a nutrient removal system comprising a means for removing a nutrient comprising nitrogen or phosphorous from wastewater;
(b) a means for moving wastewater from the land-based wastewater collection system to the wastewater treatment facility;
(c) a means for removing treated wastewater from the wastewater treatment facility; and
(d) a means for removing sludge from the wastewater treatment facility;
wherein neither the means for removing treated wastewater from the wastewater treatment facility nor the means for removing sludge from the wastewater treatment facility operate to discharge sludge or treated wastewater into the body of water.

16. The wastewater treatment facility of claim 15, wherein the means for moving wastewater from the land-based wastewater collection system to the wastewater treatment facility comprises a pipeline.

17. The wastewater treatment facility of claim 15, wherein the means for moving wastewater from the land-based wastewater collection system to the wastewater treatment facility comprises a vessel.

18. The wastewater treatment facility of claim 15, wherein the means for removing treated wastewater from the wastewater treatment facility comprises a pipeline.

19. The wastewater treatment facility of claim 15, wherein the means for removing treated wastewater from the wastewater treatment facility comprises a vessel.

20. A wastewater treatment facility situated in a body of water located offshore from a land-based wastewater collection system, the wastewater treatment facility comprising:
(a) at least a first wastewater treatment component and a second wastewater treatment component, each of the components being capable of treating at least 20 million liters per day of wastewater, and being selected from the group consisting of: a primary treatment system for reducing the amount of suspended solids or greases in wastewater; a secondary treatment system comprising bacteria capable of reducing the amount of organic matter contained in wastewater; a disinfecting treatment system comprising a means for killing a microorganism; and a nutrient removal system comprising a means for removing a nutrient comprising nitrogen or phosphorous from wastewater;
(b) a means for moving wastewater from the land-based wastewater collection system to the wastewater treatment facility;
(c) a means for removing treated wastewater from the wastewater treatment facility; and
(d) a means for removing sludge from the wastewater treatment facility.

21. The wastewater treatment facility of claim 20, wherein the first and second components differ in their manner of treating wastewater.

22. The wastewater treatment facility of claim 20, wherein the first and second components are separated by the body of water.

23. The wastewater treatment facility of claim 22, further comprising a conduit for transferring wastewater from the first component to the second component.

* * * * *

UNITED STATES PATENT AND TRADEMARK OFFICE
Certificate

Patent No. 7,153,423 B2                                Patented: December 26, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Andrew W. Gordon, Boca Raton, FL (US).

Signed and Sealed this Tenth Day of July 2007.

DUANE S. SMITH
*Supervisory Patent Examiner*
Art Unit 1724